US012683476B2

(12) United States Patent
Domingo

(10) Patent No.: US 12,683,476 B2
(45) Date of Patent: Jul. 14, 2026

(54) VOLTAGE REGULATOR MODULE AND METHOD OF OPERATING THE SAME

(71) Applicant: Infineon Technologies Austria AG, Villach (AT)

(72) Inventor: Reynaldo Domingo, Spring, TX (US)

(73) Assignee: Infineon Technologies Austria AG, Villach (AT)

( * ) Notice: Subject to any disclaimer, the term of this patent is extended or adjusted under 35 U.S.C. 154(b) by 194 days.

(21) Appl. No.: 18/373,501

(22) Filed: Sep. 27, 2023

(65) Prior Publication Data

US 2024/0113609 A1 Apr. 4, 2024

(30) Foreign Application Priority Data

Sep. 30, 2022 (DE) .......................... 102022210407.2

(51) Int. Cl.
*H02M 3/158* (2006.01)
*H02M 1/00* (2006.01)
*H02M 1/32* (2007.01)

(52) U.S. Cl.
CPC ........... *H02M 1/0003* (2021.05); *H02M 1/32* (2013.01); *H02M 3/158* (2013.01); *H02M 3/1584* (2013.01)

(58) Field of Classification Search
CPC .. H02M 3/158; H02M 3/1584; H02M 1/0003; H02M 1/0032; H02M 1/32
See application file for complete search history.

(56) References Cited

U.S. PATENT DOCUMENTS

| | | | | |
|---|---|---|---|---|
| 10,917,012 B1* | 2/2021 | Heiling | ................... | H02M 1/08 |
| 2005/0116697 A1* | 6/2005 | Matsuo | ............... | H02M 3/1584 |
| | | | | 323/282 |
| 2006/0002159 A1* | 1/2006 | Lin | ......................... | H02M 1/32 |
| | | | | 363/95 |
| 2016/0190923 A1* | 6/2016 | Veeramreddi | ......... | H02M 3/158 |
| | | | | 323/271 |
| 2017/0070149 A1* | 3/2017 | Guan | ....................... | H02M 1/36 |
| 2018/0294720 A1* | 10/2018 | Zhu | ......................... | G01K 13/00 |

OTHER PUBLICATIONS

Product brief, TDA21490; OptiMOS™ 5 90 A power stage, Document No. B112-I1102-V1-7600-EU-EC-P; Published by Infineon Technologies Austria AG; 9500 Villach, Austria; Date: Jan. 2021, pp. 1-2.
German Office Action, 10 2022 210 407.2, Jun. 15, 2023, pp. 1-5.

* cited by examiner

*Primary Examiner* — Alex Torres-Rivera
(74) *Attorney, Agent, or Firm* — Armis IP Law, LLC

(57) ABSTRACT
A voltage regulator module may comprise a control signal generation module, a power stage, and a routing network. The control signal generation module may be configured to, in a first mode of operation, generate an internal control signal for controlling the power stage. The routing network may be configured to, in the first mode of operation, apply the internal control signal to a control node of the power stage. The routing network may be configured to, in a second mode of operation, electrically connect said control node to an input pin of the voltage regulator module such that the power stage is controllable by an external control signal applied to said input pin. Thus, in the second mode of operation, it becomes possible to control the power stage directly via the external control signal and use this power stage e.g. as a single phase of a multi-phase power converter.

23 Claims, 6 Drawing Sheets

VOLTAGE REGULATOR MODULE AND METHOD OF OPERATING THE SAME

RELATED APPLICATION

This application claims priority to earlier filed Germany Patent Application Serial Number 10 2022 210 407.2 entitled "VOLTAGE REGULATOR MODULE AND METHOD OF OPERATING THE SAME," filed on Sep. 30, 2022, the entire teachings of which are incorporated herein by this reference.

TECHNICAL FIELD

The present document relates to point-of-load regulators and power stages. In general, the present document relates to multi-phase power converters comprising a plurality of power stages for performing efficient DC/DC power conversion and for providing high output currents.

BACKGROUND

In general, this invention attempts to fill gaps in the industry for 10A or less smart power stages (SPS) without creating a new family of SPS designs. Presently, only ≥20A SPS are available in the market. The invention may enable optimized voltage regulator design in low current auxiliary voltage rails section of the overall power delivery solution for CPUs/GPUs/FPGA where a multiphase and multi-loop PWM controller and SPS is employed to provide high current and fast regulation response to dynamic loads and to support high speed serial bus communication for all the primary and secondary voltage rails. It is a goal to avoid overdesign with cost penalty using >20A SPS as last option in existing CPU/GPU/FPGA VRD solution for the <10A secondary voltage rails application. Moreover, existing standalone 10A POL DCDC converter devices do not support high speed serial bus telemetry needed for CPU/GPU/FPGA power management.

In conclusion, today's various POL designs are rated to support anywhere from 1A to 40A of output loads. This invention focuses on low current POL range ≤10A to realize its full design advantages and benefits in the specific end application.

SUMMARY

According to an aspect, a voltage regulator module is presented. The voltage regulator module may also be known as point-of-load (POL) regulator and may be denoted as such within this document. The voltage regulator module may comprise a control signal generation module, a power stage, and a routing network. The control signal generation module may be configured to, in a first mode of operation, generate an internal control signal for controlling the power stage. The routing network may be configured to, in the first mode of operation, apply the internal control signal to a control node of the power stage. The routing network may be configured to, in a second mode of operation, couple (or electrically connect) said control node to an input pin of the voltage regulator module such that the power stage is controllable by an external control signal applied to said input pin.

To be more specific, the external control signal may be external not only to the power stage but may also be external to the voltage regulator module. Thus, in the second mode of operation, it becomes possible to control the power stage directly via the external control signal and use this power stage e.g. as a single phase (e.g. in loop B) of a multi-phase, multi-loop power converter (with loops A and B). For this purpose, a pulse width modulation (PWM) control signal generated by a multi-phase, multi-loop PWM controller may be applied to the input pin for controlling the switching behavior of the power stage.

On the one hand, within this document, a pin is referred to as the simplest form of a communication interface which is accessible from the outside of the voltage regulator module. A pin may be a single electrical contact at the surface of the voltage regulator module. For example, the described input pin may be used to forward external information/data to the voltage regulator module. Alternatively, other pins mentioned throughout this document may be output pins which make it possible that external entities such as e.g. microcontrollers readout internal information of the voltage regulator module via an output pin. In yet other alternatives described within this document, pins may be bidirectional pins i.e. they may be input pins within one mode of operation, and they may be output pins within another mode of operation. In any case, the skilled person will readily understand that, in practical implementations, more than one pin may be used to implement the respective communication interface.

On the other hand, within this document, the term "node" is used to denote an electrical contact within the voltage regulator module.

The routing network may be implemented at an arbitrary position on the voltage regulator module. For example, the routing network may be implemented as part of the control signal generation module. In particular, the routing network may be implemented on a control logic of the control signal generation module, and said control logic may be configured to forward the external control signal from the input pin to the control node of the power stage. Alternatively, the routing network may be implemented outside of the control signal generation module. Alternatively, the routing network may be implemented in a distributed manner partly inside the control signal generation module and partly outside the control signal generation module.

In general, the routing network may comprise any sort of circuitry for routing data signals between the various pins and nodes of the voltage regulator module. The routing network may be implemented using a microcontroller. In the simplest case, the routing network may comprise one or more switching elements. For example, metal-oxide-semiconductor field effect transistor (MOSFET) switches may be used a switching elements. Alternatively or additionally, the routing network may comprise one or more multiplexer circuits for routing said data signals. For example, the routing network may be configured to route data signals between the input pin, the control node of the power stage, and the control signal generation module. For instance, the routing network may be in a first switching state during the first mode of operation, and the routing network may be in second switching state during the second mode of operation.

The routing network may be configured to, in the second mode of operation, not apply (such as prevent application of) the internal control signal to the control node of the power stage. Thus, either the internal control signal or the external control signal may be applied to the control node. The voltage regulator module may be configured to, in the second mode of operation, disable the control signal generation module. In other words, the control signal generation module may be powered down to save energy. For this purpose, the routing network may be configured to disconnect the entire control signal generation module or at least components of the control signal generation module from respective supply rails. If the routing network itself is implemented within the control signal generation module, only those parts of the control signal generation module which do not belong to the routing network may be disabled in the second mode of operation.

The routing network may be configured to, in the first mode of operation, electrically connect the input pin to an input node of the control signal generation module, and the control signal generation module may be configured to, in the first mode of operation, generate the internal control signal based on an external feedback signal applied to said input pin.

Thus, the input pin of the voltage regulator module may be regarded as multi-function pin with at least two different functions which are never required/performed at the same time: On the one hand, the input pin may be used for transferring the external feedback signal to the control signal generation module during the first mode of operation, thereby closing a voltage feedback loop. On the other hand, the input pin may be used for transferring the external control signal directly to the power stage during the second mode of operation. As an advantage, the number of pins is reduced compared to embodiments where an additional, dedicated input pin is used for receiving the external control signal.

The routing network may be configured to, in the second mode of operation, to isolate the input pin from the input node of the control signal generation module. In other words, in the second mode of operation, the external control signal which may be applied to the input pin may bypass the control signal generation unit and may be directly applied to the control node of the power stage for controlling the switching behavior of the power stage.

The voltage regulator module may further comprise a current pin and a current sensing circuit configured to sense a current value within the power stage. The routing network may be configured to, in the second mode of operation, electrically connect the current sensing circuit with the current pin such that the sensed current value is externally readable via said current pin. The current sensing circuit may be configured to sense the current value at the output pin of the voltage regulator module. For instance, the current sensing circuit may be configured to sense the current value at the high-side switching element or at the low-side switching element.

The voltage regulator module may further comprise an overcurrent protection circuit configured to compare a current within the power stage with an overcurrent threshold value. The switching circuit may be configured to, in the first mode of operation, electrically connect the current pin with the overcurrent protection circuit such that said overcurrent threshold value can be communicated to the overcurrent protection circuit. For example, the overcurrent protection circuit may be configured to compare the current value sensed by the current sensing circuit with overcurrent threshold value. It should be mentioned that the naming "current pin" refers to the fact that the function of this pin is related to current values. As in the case of the previously mentioned input pin, the current pin may be a multi-function pin with at least two different functions which are never used at the same time: During the first mode of operation, the current pin may be used for setting the overcurrent threshold value of the overcurrent protection circuit. During the second mode of operation, the current pin may be used to output a sensed current value to an external unit such as e.g. a microcontroller or a PWM controller which may be configured to control the switching behavior of the power stage. To be more specific, such a microcontroller or PWM controller may be configured to control the power stage of the voltage regulator module based on the sensed current value. The microcontroller or PWM controller may further be configured to control a plurality of other power stages based on current values reported from said plurality of power stages as well as the sensed current value of the power stage within said voltage regulator module.

As a first advantage of the described current pin, the number of pins is reduced compared to embodiments where one current input pin is used for setting the overcurrent threshold value and another current output pin is used for reporting the measured current value. The mapping of both functions to the single current pin is in particular beneficial since both functions may be mutually exclusive i.e. either current sensing or overcurrent threshold setting is required depending on the mode of operation. Moreover, as a second advantage, this particular mapping of current related functions to the same pin may be beneficial as the current values may be communicated using the same data format. And finally, as a third advantage, as the overcurrent protection circuit is typically positioned in close vicinity of the current sensing circuit, the length of the required wiring for the data signals and/or routing network is reduced.

The voltage regulator module may further comprise a temperature pin and a temperature sensing circuit configured to sense a temperature value within the power stage. The routing network may be configured to, in the second mode of operation, electrically connect the temperature sensing circuit with the temperature pin such that the sensed temperature value is externally readable via said temperature pin.

The temperature pin may also be a multi-function pin. The voltage regulator module may comprise an internal overtemperature protection circuit configured to compare the temperature value sensed by the temperature sensing circuit with an overtemperature threshold value. The (internal) temperature sensing circuit may be sensing the temperature value both in the first and the second mode of operation. In the first mode of operation, the sensed temperature value may be used by the internal overtemperature protection circuit to avoid damage due to overheating. To this end, the internal overtemperature protection circuit may be configured to compare the sensed temperature value with a suitable temperature threshold. The result of the comparison may then be forwarded to a control logic of the voltage regulator module. The control logic may or may not be located within the control signal generation module. In the second mode of operation, the sensed temperature value may be routed to the temperature pin as described above and may be used by an external overtemperature protection circuit which may be located in an external PWM controller. Again, the external overtemperature protection circuit may be configured to compare the sensed temperature value with a suitable temperature threshold. In the second mode of operation, the internal overtemperature protection circuit may be disabled to save energy.

The voltage regulator module may comprise an enable pin electrically coupled to the routing network, wherein the routing network is configured to receive an enable signal from the enable pin and switch between the first mode of operation and the second mode of operation based on the enable signal. The enable pin may also be a multi-function pin. In particular, the enable pin may be coupled directly or via the routing network to the control signal generation module (e.g. to the control logic of the control signal generation module) for enabling the control signal generation module if the enable pin indicates the first mode of operation and for disabling the control signal generation module if the enable pin indicates the second mode of operation.

The control signal generation module may be or comprise a PWM controller with a comparator configured to, in the first mode of operation, compare a voltage at the input pin of the voltage regulator module with a reference voltage. In contrast, in the second mode of operation, the control signal generation module may be configured to not compare the voltage at the input pin with the reference voltage. Instead, the control signal generation module may be configured to receive the external control signal and forward said external control signal to the power staged. At this, the control signal generation module may be configured to not modify said external control signal. The external control signal may be a digital (or even binary) control signal for controlling the switching behavior of the power stage.

The voltage regulator module may be a monolithic integrated circuit. That is, the components of the voltage regulator module may be implemented in a single crystal, e.g. in single piece of silicon.

The power stage may comprise a driver circuit configured to generate drive signals based on a control signal at the control node of the power stage, and a half-bridge configured to couple, based on the drive signals, an output pin of the voltage regulator module alternately to an input voltage or to a reference potential.

Depending on the current mode of operation, the control signal at the control node may be either the internal control signal generated by the control signal generation module or the external control signal provided at the input pin of the voltage regulator module. The driver circuit may comprise a gate drive logic, a high-side driver circuit for driving a high-side switching element of the half-bridge, and a low-side driver circuit for driving a low-side switching element of the half-bridge. For example, the drive signals may comprise a high-side drive signal for driving a control terminal of said high-side switching element, and a low-side drive signal for driving a control terminal of said low-side switching element Throughout this document, the term "reference potential" is meant in its broadest possible sense. In particular, the reference potential is not limited to ground i.e. a reference potential with a direct physical connection to earth or a voltage of 0V. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may relate to different physical contacts although reference is made to "the" reference potential for ease of presentation.

The half-bridge may comprise the high-side switching element coupled between the input voltage and the output pin of the voltage regulator module and the low-side switching element coupled between the output pin and the reference potential.

In a typical application scenario, an external output inductor may be connected to the output pin, followed by an external output capacitor. The external output inductor and the external output capacitor may form an external output filter. In such an application scenario, the voltage regulator module may form part of a buck or boost power converter, and the output pin may then be denoted as switching node of the resulting buck or boost power converter. In the described application scenario, an output voltage at the output of said external output filter may be feedback to the input pin via an optional resistive divider, thereby forming a feedback loop.

The high-side switching element and the low-side switching may be implemented with any suitable device, such as, for example, a MOSFET, an insulated-gate bipolar transistor IGBT, a MOS-gated thyristor, or any other suitable power device. For instance, the switching elements may be implemented using III-V semiconductors such as e.g. GaN-high-electron-mobility transistors (HEMTs). Each switching element may have a gate to which a respective driving voltage or control signal may be applied to turn the switching element on (i.e. to close the switching element) or to turn the switching element off (i.e. to open the switching element).

The voltage regulator module may be configured to provide a maximum output current of 20A at an output pin of the voltage regulator module. The voltage regulator module may not be capable of generating output currents greater than 20A for an extended amount of time without getting physically damaged. More specifically, the voltage regulator module may be configured to generate a maximum output current of only 10A.

According to another aspect, a power converter module is presented. The power converter module may comprise a PWM (Pulse Width Modulation) controller and a voltage regulator module as described in the foregoing description. A PWM control output of the PWM controller may be connected to the input pin of voltage regulator module. Similarly, the current pin of the voltage regulator module may be connected to a current sensing input pin of the PWM controller. The temperature pin of the voltage regulator module may be connected to a temperature sensing input pin of the PWM controller. The enable pin of the voltage regulator module may be connected to a enable output pin of the PWM controller.

The power converter module may be a multi-phase power converter module further comprising a second power stage which is controlled by said PWM controller. The second power stage may be a stand-alone power-stage or may be embedded/integrated into second voltage regulator module which is similar or identical to the voltage regulator module described in the present document.

According to yet another aspect, a method of operating a voltage regulator module is presented. The method may comprise steps which correspond to the functional features of the voltage regulator module described in the present document. More specifically, the voltage regulator module may comprise a control signal generation module, a power stage, and a routing network. The method may comprise generating, by the control signal generation module, in a first mode of operation, an internal control signal for controlling the power stage. The method may comprise applying, by the routing network, in the first mode of operation, the internal control signal to a control node of the power stage. The method may comprise coupling (or electrically connecting), by the routing network, in a second mode of operation, said control node to an input pin of the voltage regulator module such that the power stage is controllable by an external control signal applied to said input pin.

The method may comprise not applying, by the routing network, in the second mode of operation, the internal control signal to the control node of the power stage. The method may comprise disabling, by the voltage regulator module, in the second mode of operation, the control signal generation module. The method may comprise electrically connecting, by the routing network, in the first mode of operation, the input pin to an input node of the control signal generation module. The method may comprise generating, by the control signal generation module, in the first mode of operation, the internal control signal based on an external feedback signal applied to said input pin. The method may comprise isolating, by the routing network, in the second mode of operation, the input pin from the input node of the control signal generation module.

The method may comprise sensing, by a current sensing circuit, a current value within the power stage. The method may comprise electrically connecting, by the routing network, in the second mode of operation, the current sensing circuit with a current pin such that the sensed current value is externally readable via said current pin. The method may comprise comparing, by an overcurrent protection circuit, a current within the power stage with an overcurrent threshold value. The method may comprise electrically connecting, by the switching circuit, in the first mode of operation, the current pin with the overcurrent protection circuit such that said overcurrent threshold value can be communicated to the overcurrent protection circuit.

The method may comprise sensing, by a temperature sensing circuit, a temperature value within the power stage. The method may comprise electrically connecting, by the routing network, in the second mode of operation, the temperature sensing circuit with a temperature pin such that the sensed temperature value is externally readable via said temperature pin.

The method may comprise electrically coupling an enable pin to the routing network. The method may comprise receiving, by the routing network, an enable signal from the enable pin. The method may comprise switching, by the routing network, between the first mode of operation and the second mode of operation based on the enable signal.

The method may comprise comparing, by the control signal generation module, in the first mode of operation, a voltage at the input pin of the voltage regulator module with a reference voltage.

According to yet another aspect, a method of operating a voltage regulator module is presented. The method may comprise steps which correspond to the functional features of the voltage regulator module described in the present document. More specifically, the method may comprise connecting a PWM control output of a PWM controller to the input pin of the voltage regulator module. The method may comprise connecting another power stage to another PWM control output of the PWM controller.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

SHORT DESCRIPTION OF THE FIGURES

The present invention is illustrated by way of example, and not by way of limitation, in the figures of the accompanying drawings in which like reference numerals refer to similar or identical elements, and in which FIGS. 1A and 1B illustrate shows an exemplary circuit diagram of a voltage regulator module coupled with external components in a single-phase application scenario;

DETAILED DESCRIPTION

Figure 1A:
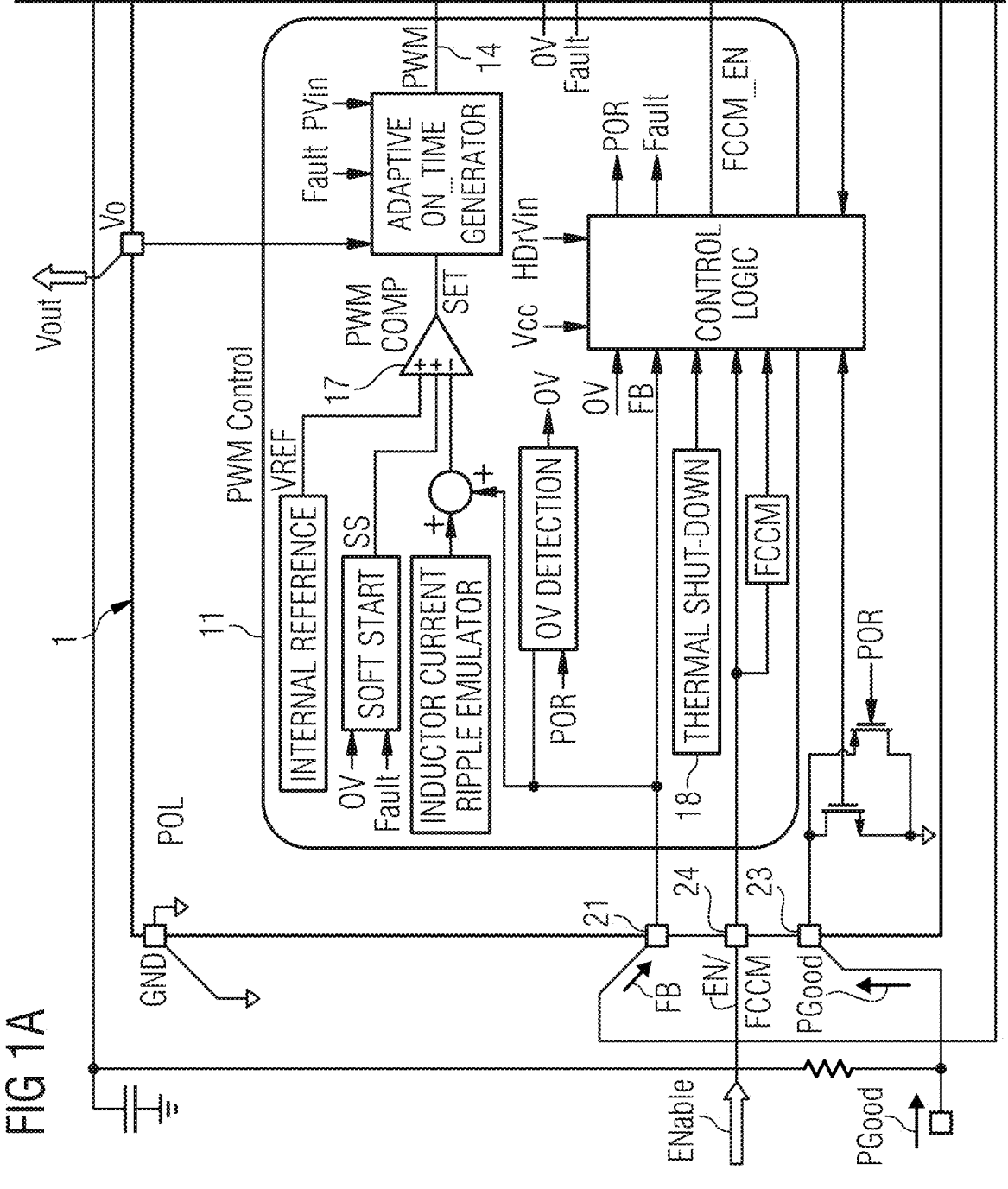
Figure 1B:
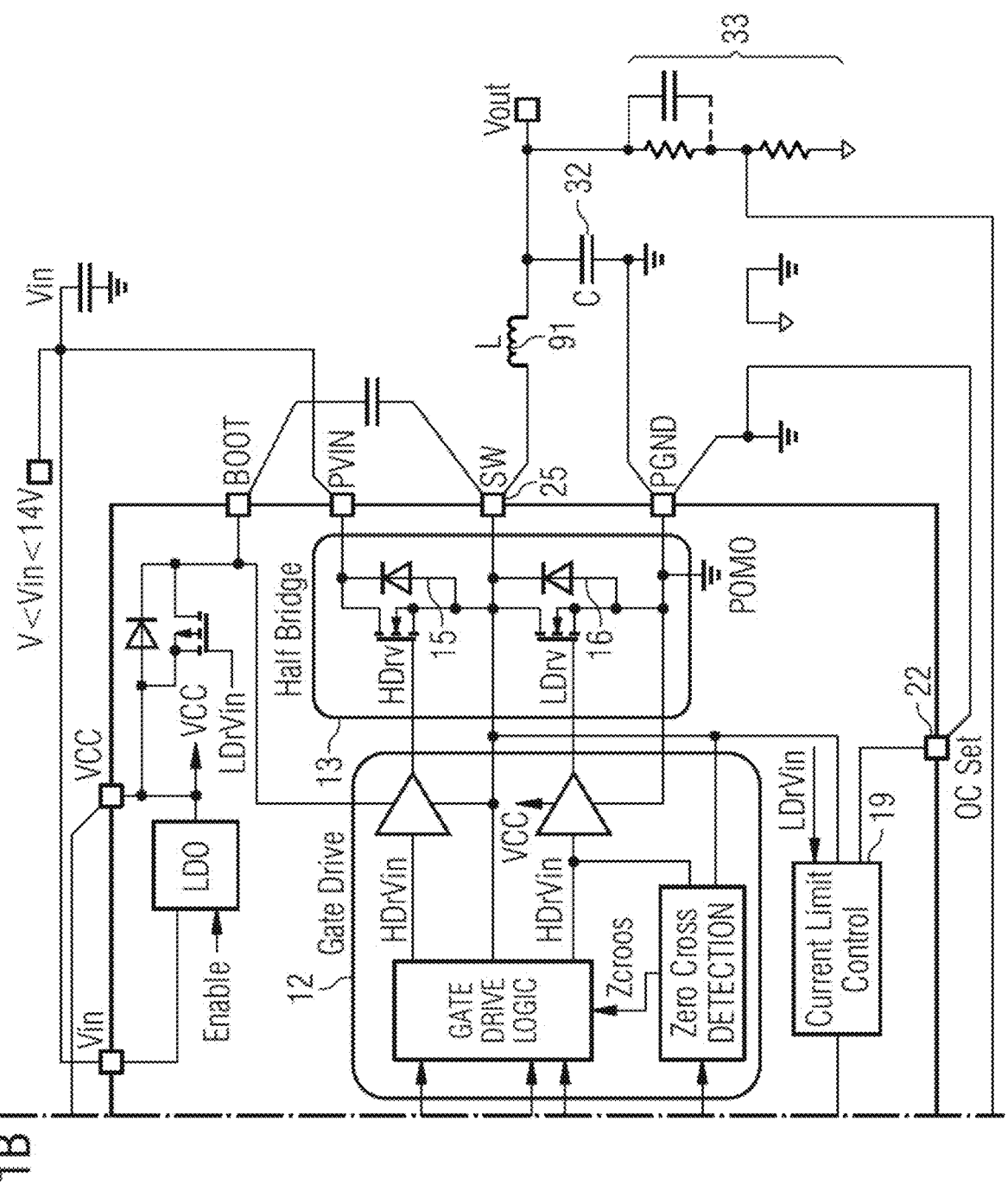

FIGS. 1A and 1B illustrate an exemplary, conventional circuit diagram of a voltage regulator module coupled with external components in a single-phase application scenario. The voltage regulator module 1 comprises a control signal generation module 11 and a power stage comprising a driver circuit 12 and a half-bridge 13. The control signal generation module 11 may be enabled via enable pin 24. The control signal generation module 11 comprises a comparator 17 for performing a comparison based on the external feedback signal at input pin 21 and a reference voltage Vref. An exemplary control node 14 of the power stage is located at the interface between the control signal generation module 11 and the driver circuit 12. The half-bridge 13 comprises a high-side switching element 15 and a low-side switching element 16. It should be mentioned that throughout the drawings of this disclosure, buck topologies are illustrated, but the principle of the present invention also applies to boost topologies.

The voltage regular module 1 has current pin 22 for setting an overcurrent threshold value for the overcurrent protection circuit 19. For example, overcurrent protection circuit 19 may also comprise a current sensing circuit. The PGood pin 23 (also denoted as temperature pin in the following description) indicates whether the supply voltage is sufficient for safe operation of the voltage regulator module. Finally, the control signal generation module 11 comprises an overtemperature protection circuit 18 which may comprise a temperature sensing circuit.

In the depicted application scenario, an external output inductor 31 may be connected to the output pin 25 of the voltage regulator module 1, followed by an external output capacitor 32. The external output inductor 31 and the external output capacitor 32 form an external output filter. In such an application scenario, the voltage regulator module 1 may form part of a buck or boost power converter, and the output pin 25 may then be denoted as switching node of the resulting buck or boost power converter. The output voltage Vout at the output of said external output filter may be feedback to the input pin 21 via an optional resistive divider 33, thereby forming a feedback loop.

Figure 2:
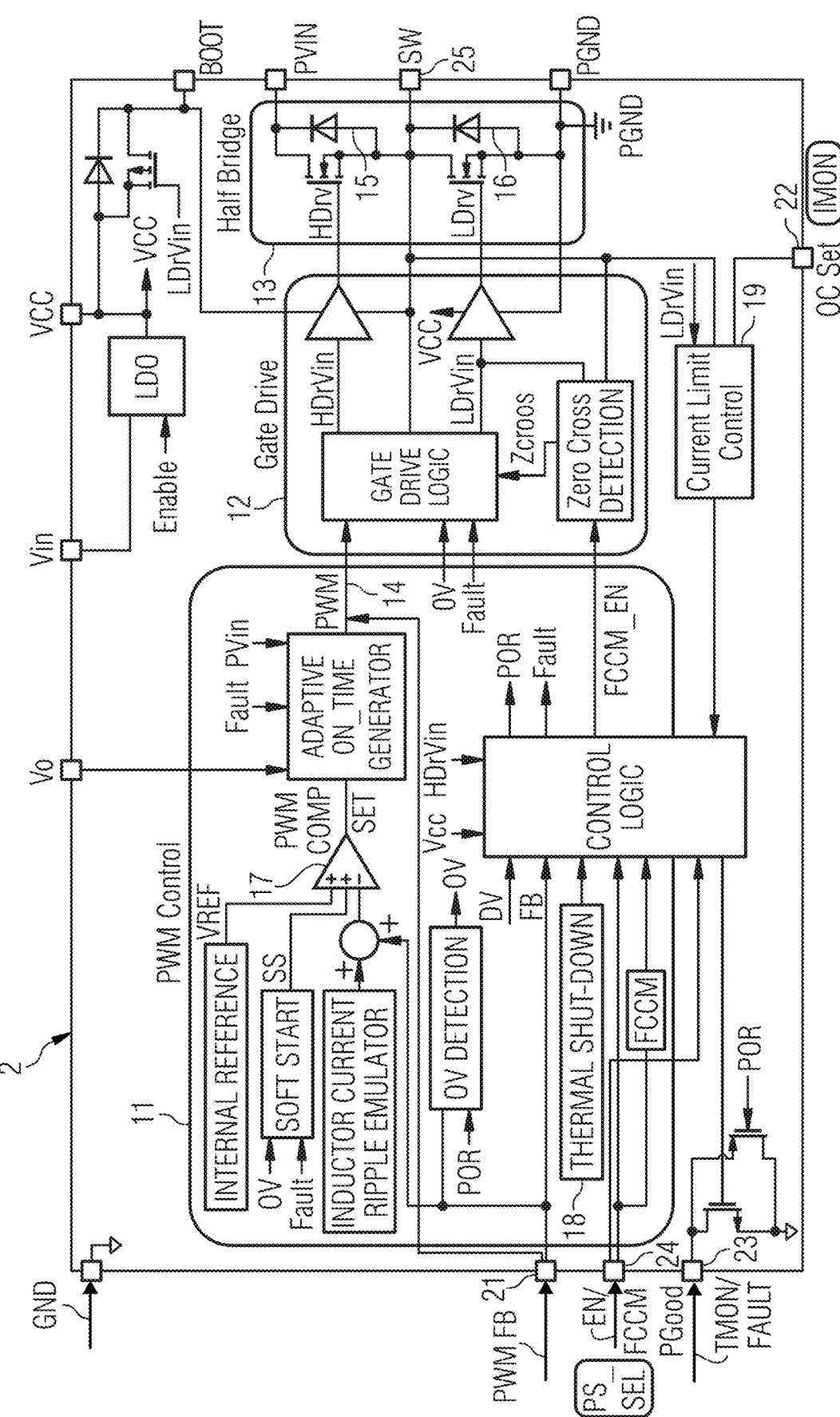
FIG. 2 shows an exemplary circuit diagram of a voltage regulator module according to the present invention.

FIG. 2 shows an exemplary circuit diagram of a voltage regulator module 2 according to the present invention. The reference numerals are the same as in FIGS. 1A and 1B. However, the power stage of voltage regulator module is now controllable via input pin 21 and enable pin 24, and the internal status (comprising e.g. current and temperature information) of the power stage may be reported to an external microcontroller via current pin 22 and temperature pin 23. For controlling the power stage, an external control signal may be applied to input pin 21, and a routing network forwards that external control signal to the control node 14 of the power stage. The routing network may be implemented within the depicted control logic of the control signal generation module 11 or elsewhere in the voltage regulator module 2. Or, in other words, the control logic may or may not form part of the control signal generation module 11.

The control signal generation module 11 generates, in a first mode of operation, an internal control signal for controlling the power stage. The routing network applies, in the first mode of operation, the internal control signal to the control node 14 of the power stage. The routing network is configured to, in a second mode of operation, electrically connect said control node 14 to the input pin 21 of the voltage regulator module 2 such that the power stage is controllable by an external control signal applied to said input pin 21.

The routing network is configured to receive an enable signal from the enable pin 24 and switch between the first mode of operation and the second mode of operation based on the enable signal. The current sensing circuit is configured to sense a current value within the power stage, and the routing network is configured to, in the second mode of operation, electrically connect the current sensing circuit with the current pin 22 such that the sensed current value is externally readable via said current pin 22. The temperature sensing circuit is configured to sense a temperature value within the power stage, and the routing network is configured to, in the second mode of operation, electrically connect the temperature sensing circuit with the temperature pin such that the sensed temperature value is externally readable via said temperature pin.

Figure 3A:
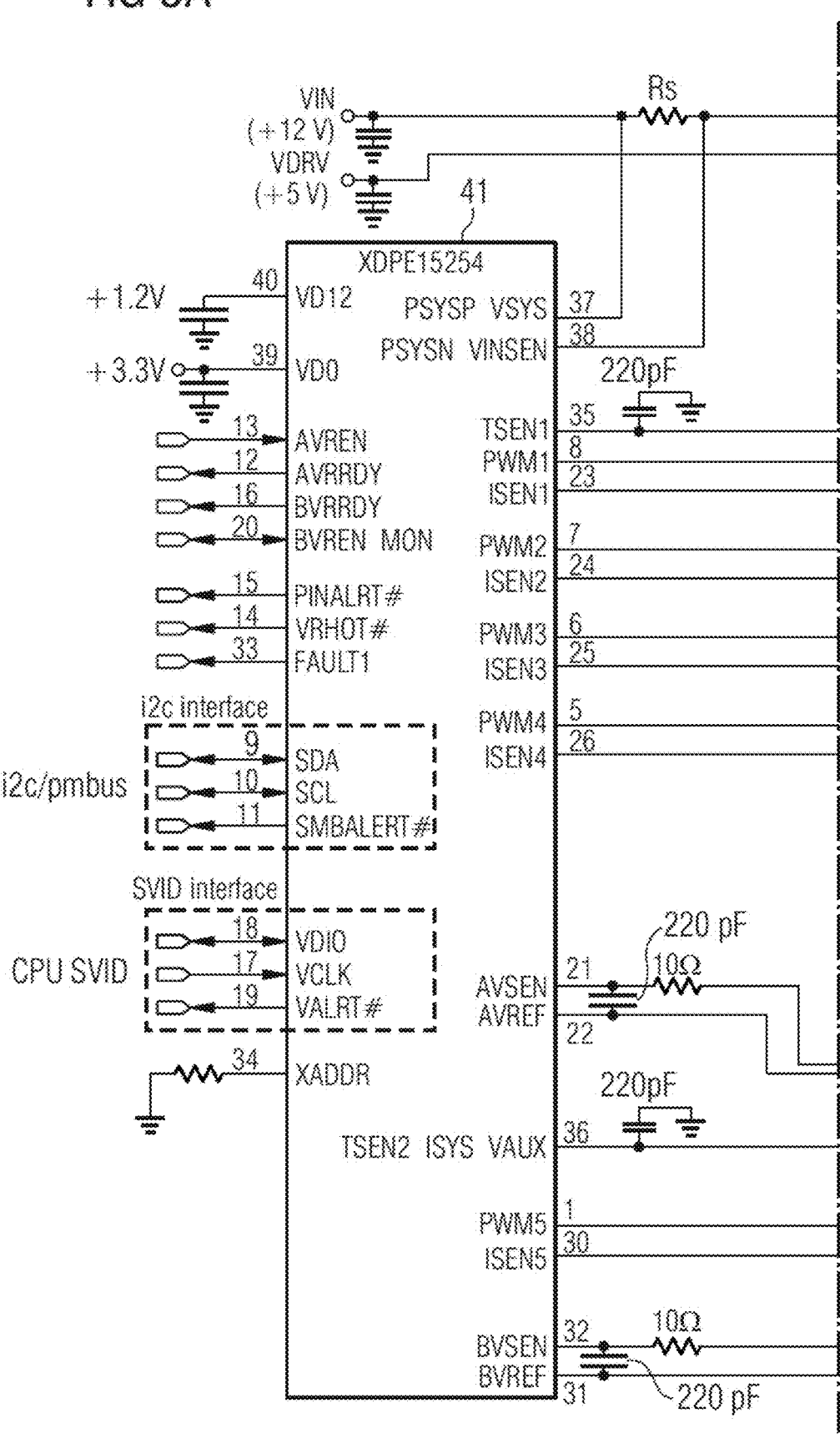
FIGS. 3A and 3B illustrate an exemplary circuit diagram of a voltage regulator module according to the present invention in a multi-phase application scenario.
Figure 3B:
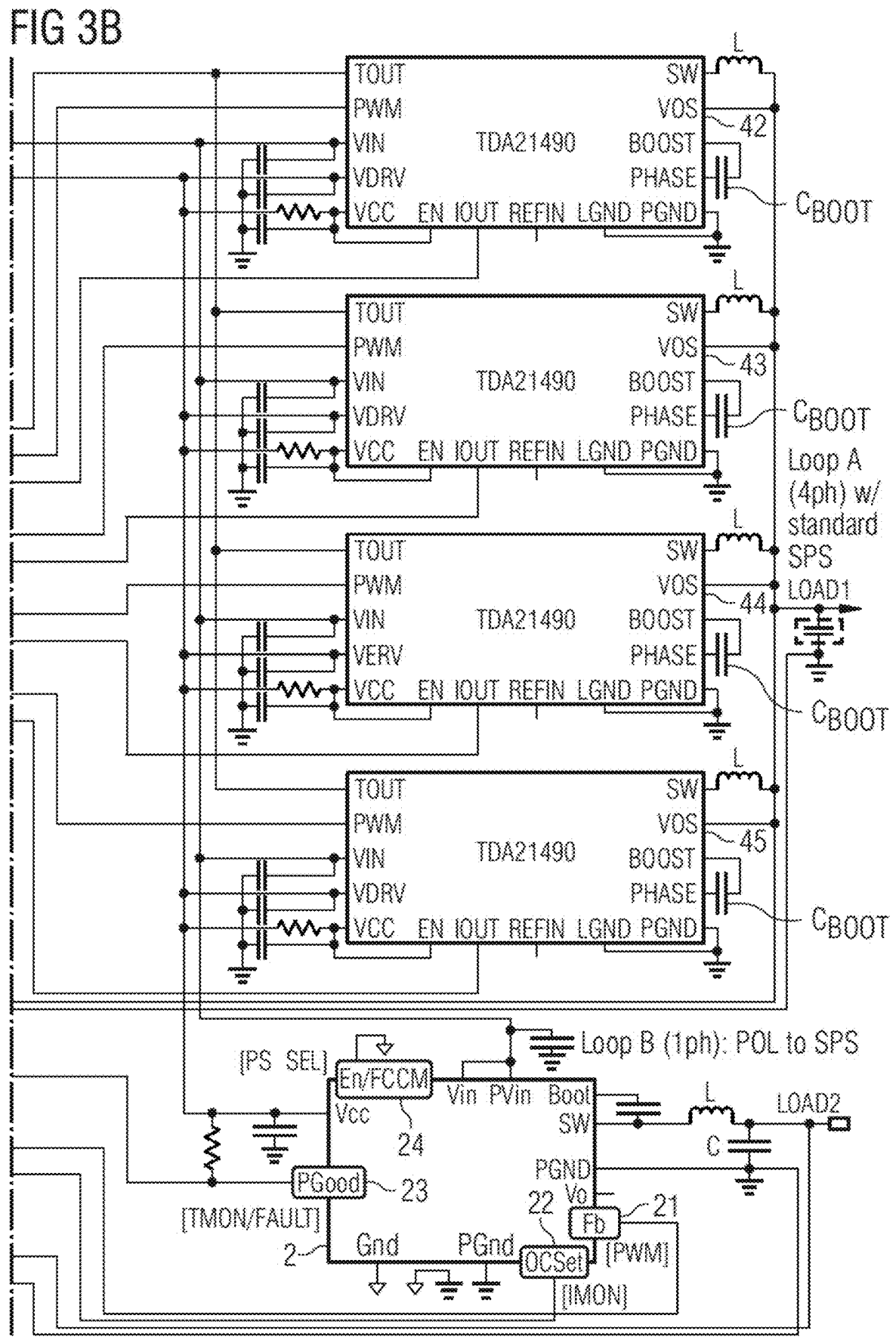

FIGS. 3A and 3B illustrate an exemplary circuit diagram of the voltage regulator module 2 according to the present invention in a multi-phase application scenario. In this example, a PWM multi-phase controller 41 is coupled to the respective pins 21, 22, 23, and 24 of the voltage regulator module 2. Moreover, four power stages 42, 43, 44, and 45 are coupled to the PWM multi-phase controller 41.

Figure 4:
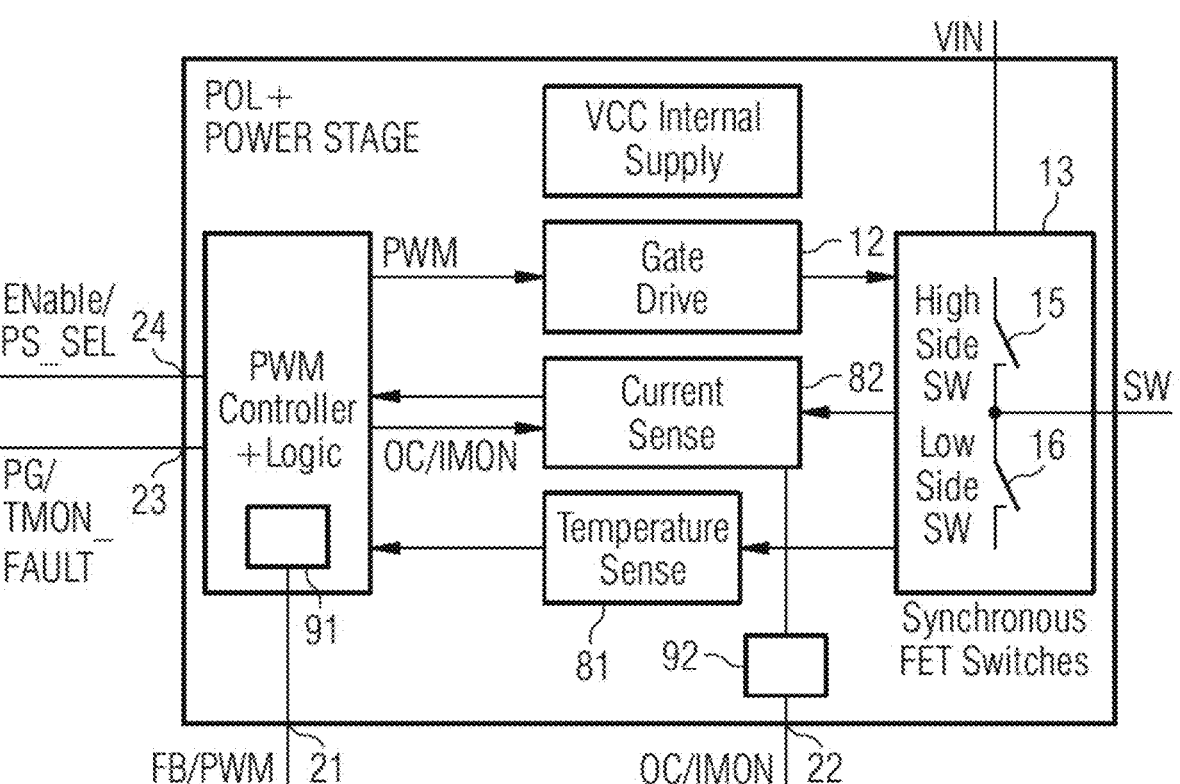
FIG. 4 shows an exemplary block diagram of a voltage regulator module according to the present invention.

FIG. 4 shows an exemplary block diagram of the voltage regulator module 2 according to the present invention. This block diagram shows one of many possible implementations of the routing network 91, 92. In this example, a first part of the routing network 91 is implemented in the control logic associated with the PWM controller. Hence, said control logic receives an enable signal from the enable pin 24 (for switching between the first and the second mode of operation), forwards an external control signal from the input pin 21 to the driver circuit 12, and forwards temperature information from the temperature sensing circuit 81 to the temperature pin 23. A second part of the routing network 92 is implemented outside of said control logic, and is configured to forward current information from the current sensing circuit 82 to the current pin 22.

The signal at the input pin 21 may be a PWM signal supporting 3.3 or 5V logic level compliant with specific PWM controller requirements. The signal at the current pin 22 may represent scaled output inductor current with specific gain and offset output. The signal at the temperature pin 23 may represent SPS temperature reporting with specific gain and offset output. The signal at the enable pin 24 may enable selection of either POL or SPS function (i.e. the first mode or the second mode of operation). The proper state (logic high or low) for function may be determined as soon as the SPS reaches its VCC UVLO. As shown PS_SEL may be low for SPS.

For example, the presented voltage regulator module may be a fully integrated all-in-one design housed in small IC package in power quad no-lead PQFN design. Together with external output inductor and capacitor, it may be designed to operate at high switching frequency to deliver regulated output voltage with respect to dynamic variations in input voltage and output loads.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A voltage regulator module comprising a control signal generation module, a power stage, and signal routing circuitry, wherein the signal routing circuitry is operative to route data signals between pins and nodes of the voltage regulator module, wherein the control signal generation module is configured to, in a first mode of operation, generate an internal control signal for controlling the power stage, wherein the signal routing circuitry is configured to, in the first mode of operation, apply the internal control signal to a control node of the power stage, and wherein the signal routing circuitry is configured to, in a second mode of operation, couple the control node to an input pin of the voltage regulator module such that the power stage is controllable by an external control signal applied to the input pin, and wherein the control signal generation module is configured to, in the first mode of operation, generate the internal control signal based on an external feedback signal applied to the input pin.

2. The voltage regulator module according to claim 1, wherein the signal routing circuitry is configured to, in the second mode of operation, prevent application of the internal control signal to the control node of the power stage.

3. The voltage regulator module according to claim 1, wherein the voltage regulator module is configured to, in the second mode of operation, disable the control signal generation module.

4. The voltage regulator module according to claim 1, wherein the signal routing circuitry is configured to, in the first mode of operation, electrically connect the input pin to an input node of the control signal generation module.

5. The voltage regulator module according to claim 4, wherein the signal routing circuitry is configured to, in the second mode of operation, isolate the input pin from the input node of the control signal generation module.

6. The voltage regulator module according to claim 1 further comprising a current pin and a current sensing circuit configured to sense a current value within the power stage, wherein the signal routing circuitry is configured to, in the second mode of operation, electrically connect the current sensing circuit to the current pin such that the sensed current value is externally readable via the current pin.

7. The voltage regulator module according to claim 6, further comprising an overcurrent protection circuit configured to compare a current within the power stage with an overcurrent threshold value, wherein the signal routing circuitry is configured to, in the first mode of operation, electrically connect the current pin with the overcurrent protection circuit such that the overcurrent threshold value can be communicated to the overcurrent protection circuit.

8. The voltage regulator module according to claim 6, wherein the sensed current value is an output current at an output pin of the voltage regulator module; and wherein the current sensing circuit is configured to sense the output current at the output pin of the voltage regulator module.

9. The voltage regulator module according to claim 1 further comprising a temperature pin and a temperature sensing circuit configured to sense a temperature value within the power stage, wherein the signal routing circuitry is configured to, in the second mode of operation, electrically connect the temperature sensing circuit with the temperature pin such that the sensed temperature value is externally readable via the temperature pin.

10. The voltage regulator module according to claim 1 further comprising an enable pin electrically coupled to the signal routing circuitry, wherein the signal routing circuitry is configured to receive an enable signal from the enable pin and switch between the first mode of operation and the second mode of operation based on a state of the enable signal.

11. The voltage regulator module according to claim 1, wherein the control signal generation module comprises a pulse width modulation (PWM) controller with a comparator configured to, in the first mode of operation, compare a voltage at the input pin of the voltage regulator module with a reference voltage.

12. The voltage regulator module according to claim 1, wherein the power stage comprises a driver circuit configured to generate drive signals based on a control signal at the control node of the power stage, and a half-bridge configured to couple, based on the drive signals, an output pin of the voltage regulator module alternately to an input voltage or to a reference potential.

13. The voltage regulator module according to claim 12, wherein the half-bridge comprises a high-side switching element coupled between the input voltage and the output pin of the voltage regulator module and the low-side switching element coupled between the output pin and a reference potential.

14. A power converter module comprising a pulse width modulation (PWM) controller and the voltage regulator module according to claim 1, wherein a PWM control output of the PWM controller is connected to the input pin of the voltage regulator module.

15. The voltage regulator module according to claim 1, wherein the signal routing circuitry is configured to, in the first mode of operation, convey the external feedback signal received at the input pin to an input node of the control signal generation module, the external feedback signal controlling the power stage in the first mode.

16. The voltage regulator module according to claim 1, wherein the signal routing circuitry is configured to, in the second mode of operation, disconnect the input pin of the voltage regulator module from the control signal generation module.

17. The voltage regulator module according to claim 1, wherein the internal control signal is a PWM (Pulse Width Modulation) signal generated by the control signal generation module.

18. The voltage regulator module according to claim 1, wherein the external feedback signal is generated based on a voltage at an output node of the voltage regulator module.

19. The voltage regulator module according to claim 1, wherein the power stage is configured to, in the second mode of operation, produce an output voltage based in part on a sensed current value at a current pin of the voltage regulator module.

20. The voltage regulator module according to claim 1, wherein the external control signal, in the second mode of operation, is applied to the input pin independent of an output voltage generated by the power stage.

21. The voltage regulator module according to claim 1, wherein the control signal generation module is configured to, in the first mode of operation, receive an output voltage of the power stage at the input node, and compare the output voltage to a reference voltage.

22. A method of operating a voltage regulator module comprising a control signal generation module, a power stage, and signal routing circuitry, the signal routing circuitry operative to route data signals between pins and nodes of the voltage regulator module, the method comprising:

generating, by the control signal generation module, in a first mode of operation, an internal control signal for controlling the power stage, applying, by the signal routing circuitry, in the first mode of operation, the internal control signal to a control node of the power stage, and electrically coupling, by the signal routing circuitry, in a second mode of operation, the control node to an input pin of the voltage regulator module such that the power stage is controllable by an external control signal applied to the input pin, and wherein the signal routing circuitry is configured to, in the first mode of operation, electrically connect the input pin of the voltage regulator module to an input node of the control signal generation module, wherein the control signal generation module is configured to, in the first mode of operation, generate the internal control signal based on an external feedback signal applied to the input pin.

23. The method of operating the voltage regulator module according to claim 22, the method comprising:

connecting a PWM control output of a PWM controller to the input pin of the voltage regulator module.

* * * * *